(12) United States Patent
Lilja et al.

(10) Patent No.: US 9,177,417 B2
(45) Date of Patent: Nov. 3, 2015

(54) VARIABLE-DEPTH STEREOTACTIC SURFACE PROJECTIONS

(71) Applicant: GE HEALTHCARE LIMITED, Buckinghamshire (GB)

(72) Inventors: Johan Axel Lilja, Uppsala (SE); Nils Lenaart Thurf Jell, Uppsala (SE); Roger Lundqvist, Uppsala (SE)

(73) Assignee: GE Healthcare Limited, Buckinghamshire (GB)

( * ) Notice: Subject to any disclaimer, the term of this patent is extended or adjusted under 35 U.S.C. 154(b) by 25 days.

(21) Appl. No.: 14/346,055

(22) PCT Filed: Sep. 28, 2012

(86) PCT No.: PCT/US2012/058076
§ 371 (c)(1),
(2) Date: Mar. 20, 2014

(87) PCT Pub. No.: WO2013/049684
PCT Pub. Date: Apr. 4, 2013

(65) Prior Publication Data
US 2014/0226898 A1    Aug. 14, 2014

Related U.S. Application Data

(60) Provisional application No. 61/541,141, filed on Sep. 30, 2011.

(51) Int. Cl.
| G06K 9/62 | (2006.01) |
| G06T 15/08 | (2011.01) |
| G06T 7/00 | (2006.01) |
| G06T 11/00 | (2006.01) |

(52) U.S. Cl.
CPC ............... *G06T 15/08* (2013.01); *G06T 7/0014* (2013.01); *G06T 11/003* (2013.01); *G06T 2207/10088* (2013.01); *G06T 2207/10104* (2013.01); *G06T 2207/10108* (2013.01); *G06T 2207/20012* (2013.01); *G06T 2207/20076* (2013.01); *G06T 2207/20212* (2013.01); *G06T 2207/30016* (2013.01)

(58) Field of Classification Search
None
See application file for complete search history.

(56) References Cited

U.S. PATENT DOCUMENTS

2009/0292551 A1    11/2009   Sirohey et al.
2010/0130848 A1     5/2010   Lin et al.

OTHER PUBLICATIONS

Thurfjell, et.al. Neuroimage, Academic Press, vol. 41, Jan. 1, 2008 p. T200.
Tomohiro, et.al. Annals of Nuclear Medicine, vol. 25, No. 10 Jul. 27, 2011, pp. 732-739.
Minoshima, et.al. Journal of Nuclear Medicine, Society of Nuclear Medicine, vol. 36, No. 7, July 1, 1995, p. 1238-1248.
Matsuda, Journal of Nuclear Medicine, Society of Nuclear Medicine, vol. 48, No. 8, Aug. 1, 2007 pp. 1289-1300.
PCT/US2012/058076 ISRWO Dated Feb. 8, 2013.

*Primary Examiner* — Brian P Werner
(74) *Attorney, Agent, or Firm* — Parks Wood LLC; Collen A. Beard, Esq.

(57) ABSTRACT

An implementation of SSP using variable depth for the vectors extending normal to the surface voxels of the brain so as to avoid white matter uptake extraction is provided. The implementation also provides the possibility to compare SSP for an individual amyloid imaging agent image to a SSP normal database and allows for 3D visualization of SSP information.

20 Claims, 7 Drawing Sheets

The figure shows slices at different levels through an amyloid negative average scan. The outer contour show the brain surface and the inner contours shows a) fixed depth at 12mm and b) variable depth computed according to the present invention.

FIG. 2A
PRIOR ART

The figure illustrates the original 3D SSP method. Cortical surface points and normal vectors are defined. When analyzing a patient scan, data along the line in the opposite direction of the normal vector is sampled and the maximum intensity along that line is extracted and projected onto the surface point.

The figure shows slices at different levels through an amyloid negative average scan. The outer contour show the brain surface and the inner contours shows a) fixed depth at 12mm and b) variable depth computed according to the present invention.

The figure shows 3D SSP maximum intensity results of an amyloid positive [18F] Flutemetamol image: a) PET values with opacity set to 50% reviling patient specific MR information; b) PET values only; c) PET values with a threshold set so MR information is visible in areas where PET values are below the threshold; d) PET values with opacity and threshold set. The same type of visualizations can be created for other intensity profile properties and for Z-scores.

The figure shows an amyloid negative subject a) SSP using fixed max depth of 12mm. Top: superior view showing SSP only. Middle: superior view showing SSP fused with patient MR. Bottom: left view showing SSP only. b) SSP using variable depth with max depth of 12mm. Top: superior view showing SSP only. Middle: superior view showing SSP fused with patient MR. Bottom: left view showing SSP only. C) PET and MR data with a trans-axial (top), a coronal (middle) and sagittal (bottom) slice of the PET and MR fused together.

FIG. 6A    FIG. 6B    FIG. 6C

The figure shows an amyloid positive subject a) SSP using fixed max depth of 12mm. Top: superior view showing SSP only. Middle: superior view showing SSP fused with patient MR. Bottom: left view showing SSP only. b) SSP using variable depth with a max depth of 12mm. Top: superior view showing SSP only. Middle: superior view showing SSP fused with patient MR. Bottom: left view showing SSP only. C) PET and MR data with a trans-axial (top), a coronal (middle) and sagittal (bottom) slice of the PET and MR fused together.

FIG. 7

VARIABLE-DEPTH STEREOTACTIC SURFACE PROJECTIONS

This application is a filing under 35 U.S.C. 371 of international application number PCT/US2012/058076, filed Sep. 28, 2012, which claims priority to U.S. application No. 61/541,141 filed Sep. 30, 2011, the entire disclosure of which is hereby incorporated by reference.

FIELD OF THE INVENTION

The present invention relates to the field of positron emission tomography (PET) or single photon emission tomography (SPECT) image analysis. More specifically, the present invention relates to an implementation of stereotactic surface projections of variable depth to minimize white matter uptake extraction.

BACKGROUND OF THE INVENTION

Figure 1:
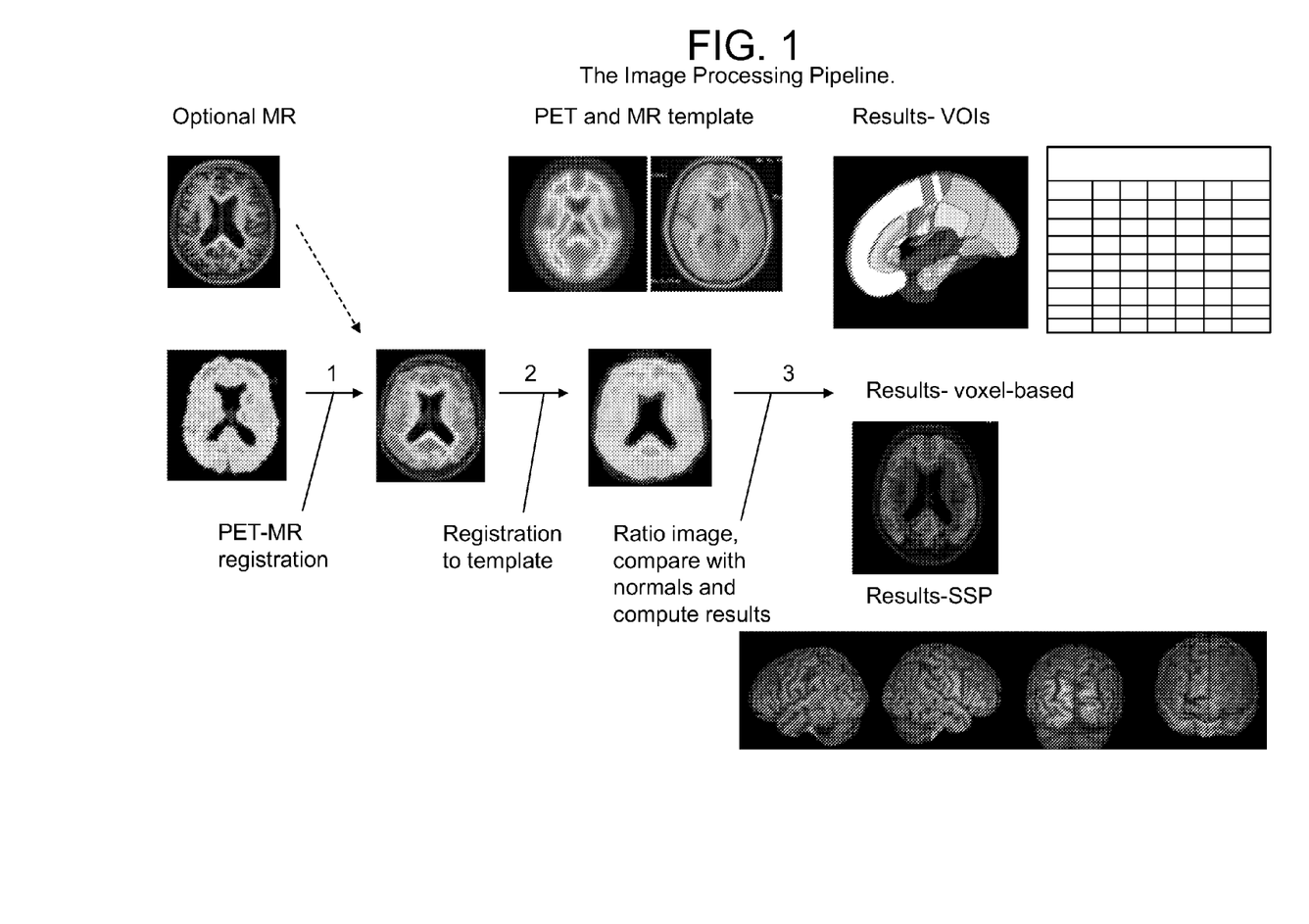
FIG. 1 depicts an image processing pipeline of the present invention.
Figure 2A:
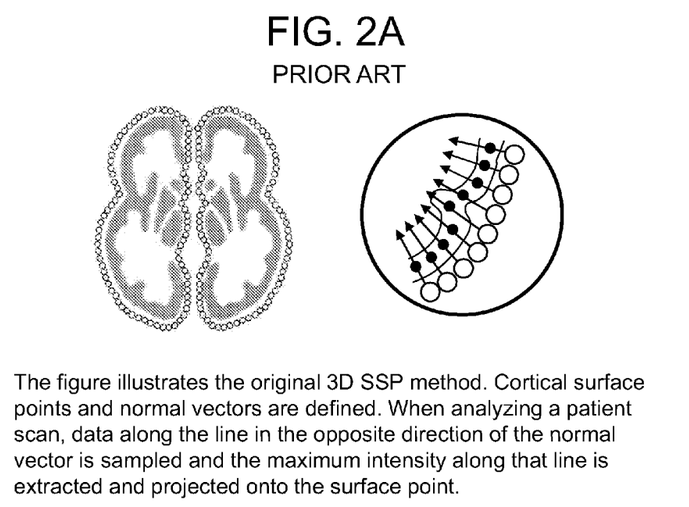
FIG. 2A depicts the principles of 3D SSP of the prior art where the depth of each vector has the same fixed length.
Figure 2B:
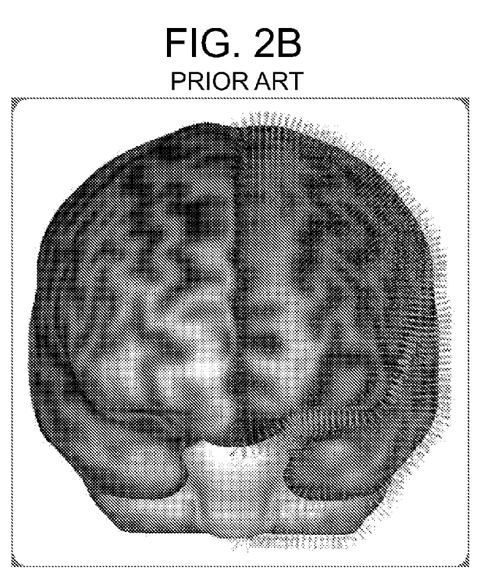
FIG. 2B depicts an image of the whole brain region showing the normal vectors through the surface (on the left hemisphere)

Three-dimensional Stereotactic surface projection (3D SSP) is a proven method of extracting cortical activity and mapping it onto the brain surface. Fluorodeoxyglucose (FDG) is a PET imaging compound, labeled with the radioactive isotope [18F]. For brain imaging, FDG issued to image cerebral metabolic rate of glucose consumption. 3D SSP has been shown to be a successful method, e.g., for detecting image patterns associated with Alzheimer's disease using FDG in PET brain imaging (PET FDG). 3D SSP has also been used for other PET and SPECT tracers, for example brain perfusion studies with SPECT using Ceretec. The 3D SSP method defines a large number of surface points on a brain model in standard space. Each surface point is associated with a normal vector. With reference to FIG. 1, when analyzing a patient PET or SPECT scan, the scan is first spatially normalized to the standard space. Then, for each cortical surface point, the data is data is sampled along the opposite direction of the normal vector into the brain to a certain depth, as shown in FIGS. 2A and 2B. The value of the maximum voxel along the ray into the brain is then mapped back to the surface point. The original 3D SSP method extends a fixed depth into the brain from each surface voxel. (Minoshima et al., *A diagnostic approach in Alzheimer's disease using three-dimensional stereotactic surface projections of fluorine-18-FDG PET*. J Nucl Med. 1995 July; 36(7):1238-48)

[18F]Flutemetamol is another PET imaging compound which binds to amyloid plaques in the brain and hence show deposition of amyloid in gray matter. Both FDG and Flutemetamol show changes in the cortical regions related to Alzheimer's disease. Yet, while PET FDG exhibits the highest uptake in the gray matter, [18F]Flutemetamol can exhibit high uptake in both gray and white matter. In [18F]Flutemetamol imaging of amyloid, there will be a significant uptake in gray matter if amyloid is present, while it will be very little or none if no amyloid is present. However, [18F]Flutemetamol also undergoes significant non-specific uptake in white matter for both amyloid positive and amyloid negative scans. This means that when using SSP in images with no or little amyloid, ie, a negative scan, there is a risk that the standard method will pick up high intensity white matter regions.

3D SSP methods of the prior art have extended the same depth into the brain from every surface voxel. Using such a single-depth for the analysis, the method thus can inadvertently extend into white matter, which will exhibit high uptake of an imaging agent like [18F]Flutemetamol. Because SSP is an attractive method for imaging both compounds, there is therefore a need in the art for a method and system which can use 3D SSP for amyloid imaging agents to observe uptake in gray matter but simultaneously minimizing the risk for blending in signal coming from white matter, as both tissues may exhibit high uptake.

SUMMARY OF THE INVENTION

In view of the needs of the prior art, the present invention provides a method of stereotactic surface projection of a PET/SPECT image using the steps of (a) spatially normalizing a PET/SPECT image, wherein each voxel on the surface of a brain is registered to a standard space, and (b) calculating 3D SSP for each surface voxel of the spatially normalized PET/SPECT image, wherein, said calculating step further comprises calculating the intensity profile along a line extending from each surface voxel and perpendicular to the surface into the cortex such that each line extends to a predefined maximum depth that is calculated individually for each surface voxel. From the intensity profile, features such as maximum intensity can be calculated but other properties such as maximum gradient, distance to a certain threshold etc. can also be computed.

The spatially-normalized PET/SPECT image may then be compared to a normal database and then the comparison may be presented and/or visualized in different ways.

The present invention also provides a non-transitory computer readable storage medium with an executable program for performing the method of the preset invention.

DETAILED DESCRIPTION OF THE PREFERRED EMBODIMENTS

The present invention is directed to the analysis of PET and SPECT images. For clarity, the term "PET/SPECT" will be used to note that either PET or SPECT is being discussed and that any example or interpretation which intends particular reference to either PET or SPECT will be respectively maintained for all further interpretations, though the term PET/SPECT may continue to be used.

The present invention provides an SSP method, including hardware and software which may be used for implementing the method to visualize properties calculated from the gray matter using an amyloid imaging agent, such as [18F]Flutemetamol, to better distinguish between amyloid positive and amyloid negative scans. Additionally, the present invention provides a computer program for implementing the method of the present invention. Additionally, the present invention provides a system for implementing the method of the present invention. A user may then compare a subject's SSP values to a normal database. Additionally, the present invention does not require an MR image, although one may be used. Additionally still, it is desired that the present invention minimize or eliminate the possibility that white matter uptake is extracted and mapped to the surface.

One method of the present invention includes the following steps; (a) spatial normalization of patients PET/SPECT scan and, optionally, an MR scan, (b) SSP calculations, (c) normals database comparisons, and (c) data presentation in 3D.

Desirably, each voxel on the surface of a brain is registered to a standard space, and the maximum intensity or other properties along a line through each surface voxel and perpendicular to the surface is calculated. The line, starting at the surface goes in the inverse direction of the vector normal to the surface, i.e. into the brain. The distance into the brain from each voxel is limited to a predefined maximum depth that is calculated individually for each surface voxel. An intensity profile is extracted through the sampling of the data at equidistant points along the line in the inverse direction of the vector normal to the surface between the surface and the maximum depth. A property calculated from this intensity profile, such as the maximum intensity, is then mapped onto a surface model of the brain or used for further calculations. Other properties which the present invention contemplates calculating from the intensity profile include maximum gradient or maximum depth to a predefined intensity threshold.

Finding Surface Voxels and Vectors Normal to the Surface

Voxels located on the outer and medial surface of the brain are predetermined using a brain mask in standard space. The brain mask is split into left and right hemispheres giving three regions in total; whole brain, left hemisphere and right hemisphere. The voxel coordinates of all surface voxels of the three regions are determined and stored.

The three regions corresponding to the whole brain, left hemisphere and right hemisphere are then smoothed by applying a Gaussian 3D filter. Vectors, normal to the surface of the regions, as done for 3D SSP and shown in FIG. 2, can then be calculated for all the coordinates of the surface voxels using the voxel intensities of the smoothed regions according to Equation 1, where $S_{ijk}$ is the voxel intensity at the image matrix location x=i, y=j and z=k and the vector normal to the surface in the same position is defined as $n_{ijk}$, $dy_{ijk}$, $dz_{ijk}$).

$$dx_{ijk}=S_{i+1,j,k}-S_{i-1,j,k}$$

$$dy_{ijk}=S_{i,j+1,k}-S_{i,j-1,k}$$

$$dz_{ijk}=S_{i,j,k+1}-S_{i,j,k-1}$$ Equation 1 Vectors normal to the surface

Calculating an Intensity Profile

Having the surface coordinates and the surface normal; for each surface voxel, data is sampled using nearest neighbor or using tri-linear interpolation using a predefined step length, along the inverse direction of the vector normal to the surface, starting at the surface and going into a predefined depth. For each surface voxel, the intensity profile (i.e., an array of intensity values) is calculated. From this intensity profile, various features such as maximum intensity are calculated. The calculated features are used for visualization or stored for further calculations.

Variable Depth

The predefined max depth vector normal to the surface is, desirably, calculated individually for each surface voxel. The rational for this is that the thickness of the cortex varies across the brain and because it is important to sample as much as possible of the cortex but without entering into white matter, where there will be high uptake of [18F]Flutemetamol regardless of whether or not there is amyloid present there. The variable depth can be computed in different ways; in the method below, the variable depth is computed using the PET standard value uptake ratio (SUVR) mean image computed as an average of amyloid negative healthy controls. An SUVR image is obtained by dividing each voxel in the scan with the value in a reference region. For [18F]Flutemetamol and for other amyloid imaging tracers, the cerebellar cortex is normally used as the reference region but other regions such as the Pons may also be used.

Desirably, a threshold is chosen by visual inspection in such way that the threshold corresponds to the boundary of gray and white matter using probabilistic gray and white matter masks for guidance. A threshold value of 45% of the max intensity value of the SUVR mean image has been found to be a useful value for discriminating between grey and white matter, although other values are contemplated to be used by the present invention.

Then, desirably for each surface voxel, starting at the surface and extending towards the brain interior, data along each normal vector were sampled. The present invention contemplates that the data may be sampled along a fixed step length along each vector, such as at 0.1 mm intervals. The present invention desirably employs both a maximum depth, or distance to the surface, and a minimum depth, or distance to the surface, for each vector. The maximum distance to the surface, $d_{max}$, may be set to 12 mm, although the present invention contemplates that other values may be used. The minimum distance to the surface, $d_{min}$, may be set to 6 mm, although the present invention contemplates that other values may be used. The individual SSP max depth for each surface voxel was determined using the following criteria:

1) Starting at the surface, continue sampling along a line in the inverse direction of a vector normal to the surface until a value, larger than the threshold, is sampled or $d_{max}$ has been reached.

a) If a value larger than the threshold is found, use the depth of where this value was found as the SSP max depth for the current surface voxel.

b) If no value larger than the threshold is found, use $d_{max}$ as the SSP max depth for the current surface voxel.

c) If a value larger than the threshold is found and its depth is less than the minimum depth, set the SSP max depth for this surface voxel to the minimum depth $d_{min}$.

The use of a minimum depth for SSP allows for compensation for atrophy or possible errors in the spatial normalization of the cortex. This means, when calculating the max intensity SSP value, the sampling will start at the surface and reach a depth between, in this example, 6 and 12 mm into the brain.

Figure 3:
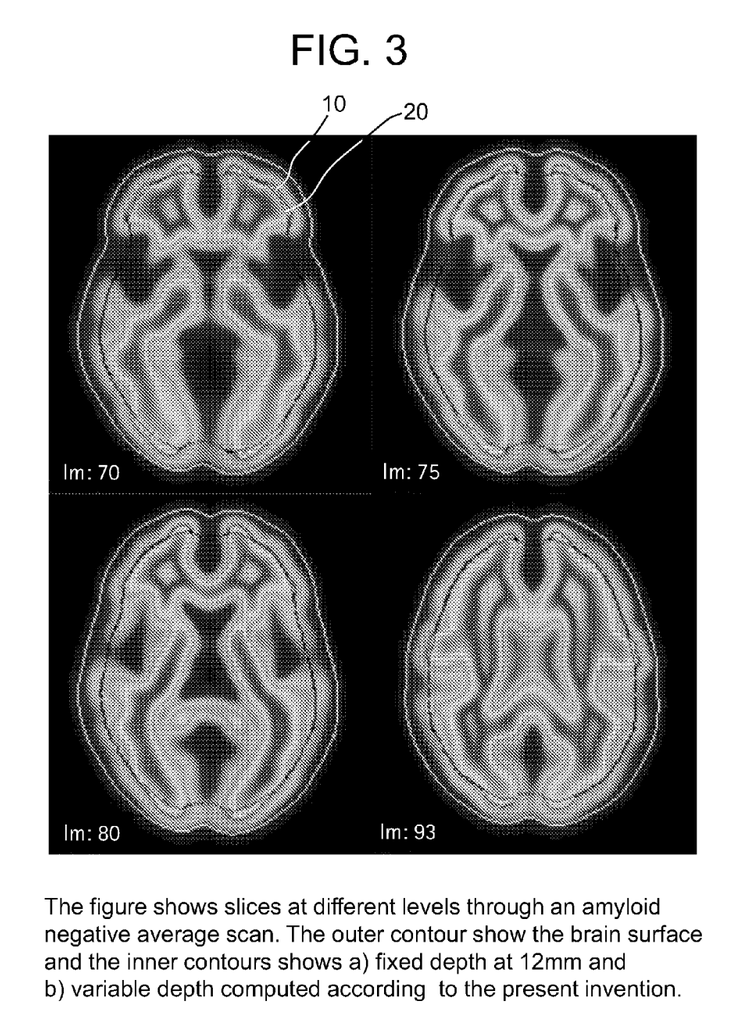
FIG. 3 depicts a variable surface projection depth according to an exemplary embodiment of the present invention.

In FIG. 3 the variable depth for SSP is illustrated. The white, outer contour, displays the brain mask and the inner contours 10 and 20 display the maximum depth for surface projections. Note where the inner contours split into two different parts. The inner part 10 shows a fixed depth of 12 mm while the outer part 20 shows the variable depth ranging between a minimum depth of 6 mm and a maximum depth of 12 mm. The PET image displayed is an SUVR mean image of amyloid negative healthy controls.

In the description above, the SSP max depth was determined using a threshold on the PET SUVR value. However, it is understood that the SSP max depth for a surface voxel can be defined based on information from MRI by computation of the thickness of the cortex of a gray, white, CSF segmented scan, or in an average of several segmented scans. Further-more, it should be noted at the step outlined above is only done once for all and the individual SSP max depth is stored in the list.

It is further contemplated that a correction factor could be used to adjust the max depth depending on the age of the subject. For example, it is known that with age, the thickness of the cortex gets thinner during normal aging, so one could reduce the maximum depth so it also gets smaller with age. By way of illustration but not of limitation, it is contemplated that the maximum depth may be multiplied by an age-correction factor to readjust the maximum depth for age.

Normal Database

To create the normal database for SSP, the registered SUVR mean image from the normal material may be used. For each subject in the normal database one of several features from the intensity profile such as the intensity max ($SSP_{Imax}$) along the ray in the inverse direction of the vector normal to the surface is calculated for each surface voxel, starting at the surface going into the pre-calculated individual depth. Having the $SSP_{Imax}$ values for each surface voxel for all healthy images, mean and standard deviation for each voxel are calculated, $Maxref_{mean}$ and $Maxref_{sd}$ respectively. These are then stored as the normal database for SSP.

Patient Analysis

Desirably, the SUVR image of the patient PET/SPECT image is used for SSP analysis and visualization. For each surface voxel, starting at the surface, following a line in the direction of the inverse direction of the vector normal to the surface, values are sampled at a step length to the individual precalculated max depth. The step length is desirably a fixed distance for all of the vectors, such 0.1 mm or 0.5 mm. The maximum value along the line, MaxPat, is calculated. Projecting the MaxPat value directly onto the 3D surface gives the SSP SUVR view. The MaxPat for each surface voxel is then compared to the normal database having the mean, $Maxref_{mean}$, and standard deviation, $Maxref_{std}$, for the corresponding voxel. The Z-score is calculated for each voxel according to Equation 2.

SSP Z-score calculation formula $$Z = \frac{MaxPat - Maxref_{mean}}{Maxref_{std}} \quad \text{Equation 2}$$

The Z-score represents the number of standard deviations from average a single patient is compared to the group. The Z-scores are then projected onto the 3D surface giving the SSP Z-Score view. While the above illustrates Z-score calculations for maximum intensity, it is also contemplated by the present invention that other features calculated from the intensity profile, such as gradient or maximum depth to a predefined intensity threshold, can be stored in the normal database and used in patient analysis.

3D Visualization

Using the smoothed masks of the whole brain, left hemisphere and right hemisphere, a triangulated 3D mesh can be created for each of the masks e.g. using the marching cubes algorithm. The 3D mesh surfaces are stored and are used for the SSP 3D visualization.

MR Visualization

If the patient's MR is present, it is transformed to the standard space along with the patient's PET/SPECT image. Having the patient's MR in standard space, its intensities can be projected onto the 3D surface. Since the 3D surface is created in such way that it is on the surface of the brain in the template space, not much anatomical information of the brain is shown if the MR intensity values are taken from voxels corresponding to points of the 3D surface mesh. To receive more anatomical details the MR intensities from a certain depth is projected up to the surface.

For each point of the 3D surface mesh defined in the standard space, the coordinate being located at a predetermined distance from the surface, in the direction of the inverse direction of the vector normal to the surface, is calculated. For this coordinate, an MR intensity value is calculated using tri-linear interpolation and mapped to the corresponding point on the 3D mesh.

Visual inspection of a large set of MR images has shown a depth of 6 mm to be suitable for the predetermined depth for MR intensity projections, since it gives detailed anatomical information of the MR images as well as being deep enough to compensate for possible registration errors and atrophy. If no MR is provided for the patient, the T1 weighted template may be used for MR visualization.

PET—MR Visualization

Figure 4A:
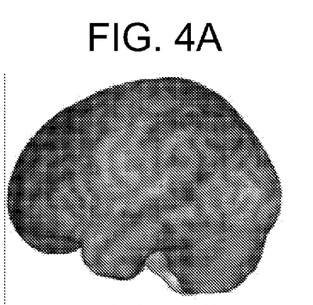
FIG. 4 depicts different ways to visualize the results of the 3D SSP analysis.
Figure 4B:
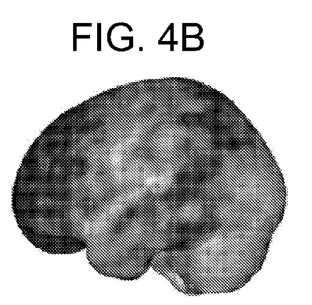
Figure 4C:
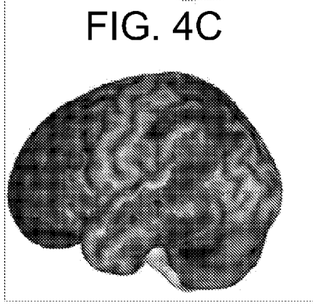
Figure 4D:
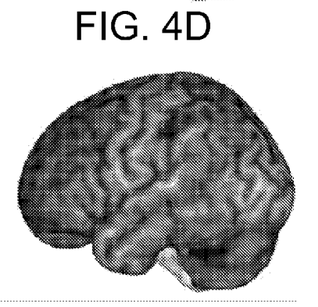

The present invention may also be employed in a fusion view of 3D SSP where PET and MR information can be blended ranging from only MR to only PET, as shown in FIG. 4a and FIG. 4b. Also a threshold for the SSP can be set in such way that SSP values below the threshold will display only MR values, as shown in FIG. 4c and FIG. 4d. FIG. 4 shows 3D SSP maximum intensity results of an amyloid positive [18F] Flutemetamol image. FIG. 4a shows PET values with opacity set to 50% reviling patient specific MR information. FIG. 4b shows PET values only. FIG. 4c shows PET values with a threshold set so MR information is visible in areas where PET values are below the threshold. FIG. 4d shows PET values with opacity and threshold set. The present invention contemplates that the same type of visualizations can be created for other intensity profile properties and for Z-scores.

From the intensity profile, features such as maximum intensity can be calculated but other properties such as maximum gradient, distance to a certain threshold etc. can also be computed. These other features or properties may complement maximum intensity and may help achieve better separation between healthy and diseased patients.

Figure 7:
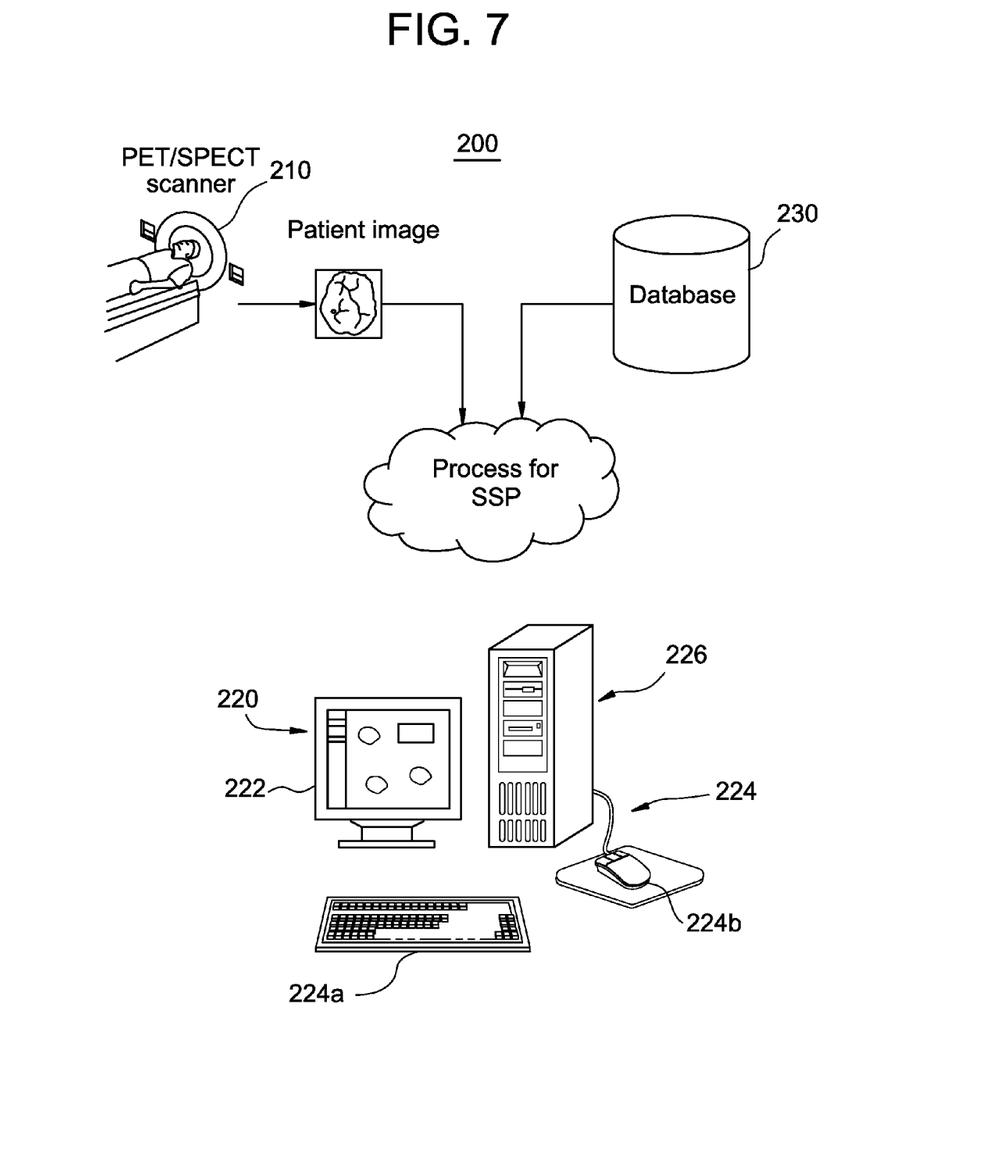
FIG. 7 depicts a PET system of the present invention.

Referring now to FIG. 7, the method of the present invention is contemplated to be performed by PET system 200 of the present invention. System 200 includes a scanner 210 for performing PET or SPECT scans, a computer 220 for receiving scan images, e.g. the patient image, and a database 230 for providing a database including images, such as the normal database, used in a method of the present invention. Computer 220 typically includes a display 222, an input device 224 such as a keyboard 224a and a mouse 224b, and a processor 226. Processor 226 typically includes software for performing the method of the instant invention using the database 230 and the patient image from scanner 210. Additionally, processor 226 is contemplated to include non-transitory computer readable storage medium with an executable program for performing an SSP method of the present invention using the image from scanner 210. The non-transitory computer readable storage medium includes computer-readable program code including instructions for performing the SSP method of the present invention and desirably for displaying an image showing the results thereof. Connections between scanner 210, computer 220, and database 230 are contemplated to be by any means known to the art, such as hardwire, wireless, or any combination thereof.

The present invention thus further provides a positron emission tomography (PET) system 200 for implementing the SSP method of the present invention. The PET system includes storage device 230, a detector 210 for detecting positron emissions from a brain of a subject, wherein the detector 210 generates signals representing the positron emissions, or the image, that are stored in storage device 230. PET system 200 further includes an image processor 226 that is programmed to a) generate a PET image data set comprising surface voxels based on the signals stored in storage device 230; wherein the surface voxels represent a surface of the brain of the subject, b) store the PET image data set in storage device 230, c) spatially normalize the PET image data set, wherein the surface voxels are registered to a standard space for a brain; and d) calculate a stereotactic surface projection (SSP) data set for the surface voxels by calculating a maximum intensity along a line extending from the surface voxels and perpendicular to the surface of the brain into brain tissue such that each line extends to a predefined maximum depth, wherein the image processor 226 calculates the predefined maximum depth individually for each surface voxel such that at least some positron emissions from brain white matter are eliminated from the SSP data set. PET system 200 desirably further includes a display device 222 for displaying an image of the brain based on the SSP data set.

The present invention further provides a computer-implemented method of calculating a stereotactic surface projection (SSP) of a PET/SPECT image. The method includes the steps of
 (a) receiving a PET/SPECT image data set of a brain of a subject that has been generated with a PET/SPECT detector;
 (b) storing the PET/SPECT image data set in a memory;
 (c) spatially normalizing the PET/SPECT image data set with an image processor, wherein the image processor is programmed to register each voxel on the surface of the brain to a standard space for a brain, and
 (d) calculating, with the image processor, an SSP data set for the surface voxels of the spatially normalized PET/SPECT image data set, wherein the calculating step comprises calculating a maximum intensity along a line extending from each surface voxel and perpendicular to the surface into the brain tissue such that each line extends to a predefined maximum depth that is calculated individually by the image processor for each surface voxel such that at least some positron emissions from brain white matter are eliminated from the SSP data set.

The present invention still further provides a non-transitory storage medium comprising computer readable program code including instructions for generating a stereotactic surface projection (SSP) image, wherein execution of the computer readable program code causes a processor to carry out the steps of:
 (a) receiving a PET/SPECT image data set of a brain of a subject that has been generated with a PET/SPECT detector;
 (b) storing the PET/SPECT image data set in a memory;
 (c) spatially normalizing the PET/SPECT image data set with the processor, wherein the processor is programmed to register each voxel on the surface of the brain to a standard space for a brain, and
 (d) calculating, with the processor, an SSP data set for the surface voxels of the spatially normalized PET/SPECT image data set, wherein the calculating step comprises calculating a maximum intensity along a line extending from each surface voxel and perpendicular to the surface into the brain tissue such that each line extends to a predefined maximum depth that is calculated individually by the processor for each surface voxel such that at least some positron emissions from brain white matter are eliminated from the SSP data set.

Results

Following are representative images showing implementation of SSP using a fixed max depth compared to variable max depth, both for healthy tissue, FIG. 5, and Alzheimer's disease, FIG. 6.

FIG. 5 depicts an amyloid negative subject. Column "a" displays SSP using fixed max depth of 12 mm. The top image in Column "a" is a superior view showing SSP only, the middle image is a superior view showing SSP fused with patient MR, while the bottom image is a left view showing SSP only. Column "b" displays SSP using variable depth with a max depth of 12 mm. The top image in Column "b" is a superior view showing SSP only, the middle image is a superior view showing SSP fused with patient MR, while the bottom image is a left view showing SSP only. Column "c" displays both PET and MR data with a trans-axial (top image), a coronal (middle image) and sagittal (bottom image) slice of the PET and MR fused together. FIG. 5 was originally prepared as a color image so some detail is lost in a black and white copy thereof. The PET and MR image show no uptake in the cortical regions according to the data. The SSP maps of column a show more areas of high uptake due to uptake in the white matter which is detected using the probe of fixed depth. The middle image shows much less activity due to white matter uptake as the variable depth analysis is better able to avoid reading from white matter. The images in column c show that this subject has high uptake only in the white matter areas.

FIG. 6 depicts an amyloid positive subject. Column "a" displays SSP using fixed max depth of 12 mm. The top image in Column "a" is a superior view showing SSP only, the middle: image is a superior view showing SSP fused with patient MR, while the bottom image is a left view showing SSP only. Column "b" displays SSP using variable depth with a max depth of 12 mm. The top image in Column "b" is a superior view showing SSP only, the middle image is a superior view showing SSP fused with patient MR, while the bottom image is a left view showing SSP only. Column "c" displays combined PET and MR data with a trans-axial (top image), a coronal (middleimage) and sagittal (bottom image) slice of the PET and MR fused together.

FIG. 6 was originally prepared as a color image so some detail is lost in a black and white copy thereof. The PET and MR image in column c show areas of high uptake in the cortical regions according to the data. The fixed depth SSP maps of column a show areas of high uptake due to uptake in the cortical grey matter which is detected using the probe of fixed depth. The image of column b show similar activity using a probe of variable depth thus validating the present invention's approach.

In comparing the images in FIGS. 5 and 6, FIGS. 5a and 6a shows SSP using a fixed max depth of 12 mm. FIGS. 5b and 6b shows SSP using a variable depth, where the maximum depth is set to 12 mm. FIGS. 5c and 6c shows orthogonal views of the patients SUVR image superimposed on its MR image.

Figure 5A:
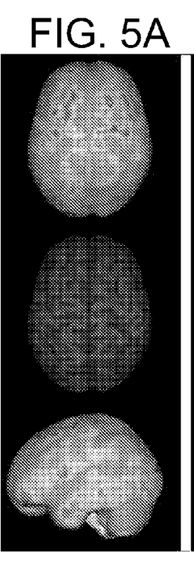
FIG. 5 depicts an amyloid negative subject with results from 3D-SSP using a) fixed depth and b) variable depth.
Figure 5B:
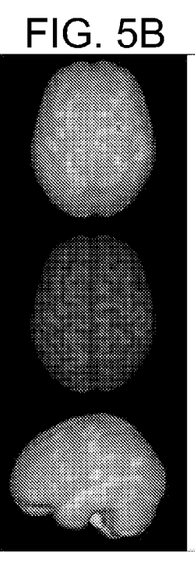

In FIG. 5a showing a healthy tissue scan with fixed max depth of 12 mm, some of the high SUVR values are correlated with the gyri indicating that white matter is picked up, while the correlation is much less in FIG. 5b showing the same scan with variable max depth.

Figure 5C:
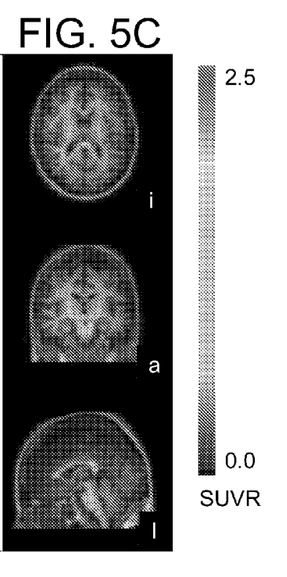

According to FIG. 5c there is significantly less uptake in gray matter than in white matter. This and just a few hotspots in FIG. 5b shows that only a small amount of white matter uptake is extracted using variable depth SSP compared to fixed depth SSP, having more and larger hotspots.

Figure 6A:
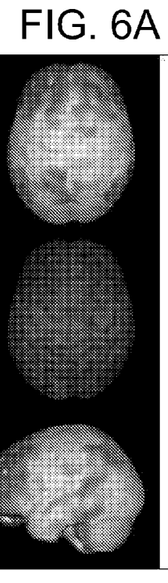
FIG. 6 depicts an amyloid positive subject with results from 3D-SSP using a) fixed depth and b) variable depth.
Figure 6B:
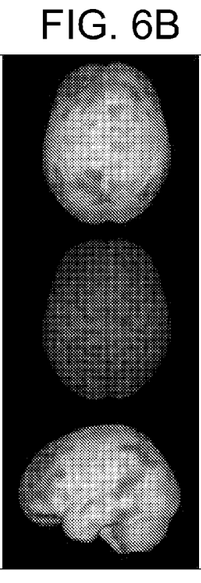
Figure 6C:
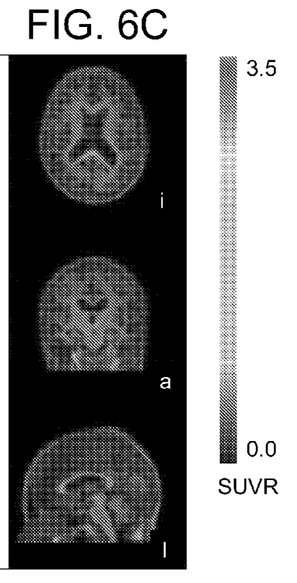

In FIG. 6c the patient SUVR image is fused on the patients MR image. In FIG. 6c one can see that there are cortical areas with significant uptake in gray matter, which is also reflected in both FIGS. 6a and 6b.

The present invention also provides a non-transitory computer readable storage medium with an executable program for performing the method of the present invention. The method of the present invention may be provided as computer program code for loading on, or loaded onto, a system for taking and/or analyzing PET or SPECT images.

While the particular embodiment of the present invention has been shown and described, it will be obvious to those skilled in the art that changes and modifications may be made without departing from the teachings of the invention. For example, where the present invention has been demonstrated using PET image data, the present invention is contemplated to be equally applicable to SPECT image analysis. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A method of stereotactic surface projection of a PET/SPECT image comprising the steps of;
   (a) spatially normalizing a PET/SPECT image, wherein each voxel on the surface of a brain is registered to a standard space, and
   (b) calculating SSP for each surface voxel of the spatially normalized PET/SPECT image, wherein, said calculating step further comprises calculating the maximum intensity along a line extending from each surface voxel and perpendicular to the surface into the tissue such that each line extends to a predefined maximum depth that is calculated individually for each surface voxel.

2. A method of claim 1, further comprising the steps of:
   (c) comparing the spatially normalized PET/SPECT image to a normals database, and
   (d) presenting data in 3D.

3. A method of claim 1, wherein said spatially normalizing step further comprises spatially normalizing the PET/SPECT image with an MR scan.

4. A method of claim 1, wherein said predefined maximum depth for each surface point, is adjusted for age through the multiplication of an age correction factor.

5. A method of claim 1, wherein voxels located on the outer and medial surface of the brain are predetermined using a brain mask in standard space.

6. A method of claim 5, wherein the brain mask is split into left and right hemispheres so as to define a whole-brain region, a left hemisphere region, and a right hemisphere region, and wherein the voxel coordinates of all surface voxels of the three regions are determined and stored.

7. A method of claim 5, wherein the brain mask is split into left and right hemispheres so as to define a whole-brain region, a left hemisphere region, and a right hemisphere region, and further comprising the step of smoothing the three binary regions corresponding to whole brain, left hemisphere, and right hemisphere by applying a Gaussian 3D filter.

8. A method of claim 7, wherein the vectors normal to the surface of the regions are calculated for all the coordinates of the surface voxels using the voxel intensities of the smoothed regions according to Equation 1.

9. A method of claim 8, wherein data is sampled using nearest neighbor or tri-linear interpolation using a predefined step length, along a line the inverse direction of the vector normal to the surface, starting at the surface and going into a predefined depth and an intensity profile defined as an array of intensity values along the line is calculated and stored.

10. A method of claim 9, wherein for each surface voxel, the maximum intensity calculated from the intensity profile.

11. A method of claim 9, wherein for each surface voxel, the maximum gradient is calculated from the intensity profile.

12. A method of claim 9, wherein for each surface voxel, the maximum depth to a predefined intensity threshold is calculated from the intensity profile.

13. A method of claim 9, wherein the predefined max depth vector normal to the surface is calculated individually for each surface voxel.

14. A method of claim 9, wherein a threshold on an amyloid negative average image is chosen in such way that the threshold corresponds to the boundary of gray and white matter as determined by using probabilistic gray and white matter masks.

15. A method of claim 9, wherein data is sampled along a fixed step length along each vector.

16. A method of claim 1, further comprising the step of assigning a maximum depth for each vector from its corresponding surface voxel, the assigning step further comprising:
   Determining a maximum depth limit and a minimum depth limit for each vector;
   Sampling along each vector until either sampling a value larger than the threshold or the maximum depth limit has been reached, wherein
   a) if a value larger than the threshold is found, the depth of where this value was found is assigned as the maximum depth for the vector from the corresponding surface voxel;
   b) If no value larger than the threshold is found, the maximum depth limit is assigned as the maximum depth for the vector from the corresponding surface voxel, and
   c) If a value larger than the threshold is found and its depth is less than the minimum depth limit, assigning the minimum depth limit as the maximum depth for the vector from the corresponding surface voxel.

17. The method of claim 1, wherein the step of comparing to a Normals database further comprises the step of:
   Sampling values along a line extending normally from each surface voxel of the healthy tissue sample image into the tissue to a pre-calculated maximum depth;
   Calculating a feature value for each line in the sampling step, wherein said feature value calculated is at least one of maximum value, gradient, and the value of maximum depth to a predefined intensity threshold;
   Comparing the feature value from the calculating step for each surface voxel to the corresponding surface voxel of the normal database having a mean value and a and standard deviation of the same feature; and
   Calculating a Z-score for each voxel according to Equation 2.

18. A non-transitory computer readable storage medium with an executable program for performing the method of any of claim 1.

19. A positron emission tomography (PET) system comprising:
   a storage device;
   a detector for detecting positron emissions from a brain of a subject, wherein the detector generates signals representing the positron emissions that are stored in the storage device;

an image processor that is programmed to:
- generate a PET image data set comprising surface voxels based on the signals stored in the storage device; wherein the surface voxels represent a surface of the brain of the subject;
- store the PET image data set in the storage device;
- spatially normalize the PET image data set, wherein the surface voxels are registered to a standard space for a brain; and
- calculate a stereotactic surface projection (SSP) data set for the surface voxels by calculating a maximum intensity along a line extending from the surface voxels and perpendicular to the surface of the brain into brain tissue such that each line extends to a predefined maximum depth, wherein the image processor calculates the predefined maximum depth individually for each surface voxel such that at least some positron emissions from brain white matter are eliminated from the SSP data set.

20. A non-transitory storage medium comprising computer readable program code including instructions for generating a stereotactic surface projection (SSP) image, wherein execution of the computer readable program code causes a processor to carry out the steps of:
  (a) receiving a PET/SPECT image data set of a brain of a subject that has been generated with a PET/SPECT detector;
  (b) storing the PET/SPECT image data set in a memory;
  (c) spatially normalizing the PET/SPECT image data set with the processor, wherein the processor is programmed to register each voxel on the surface of the brain to a standard space for a brain, and
  (d) calculating, with the processor, an SSP data set for the surface voxels of the spatially normalized PET/SPECT image data set, wherein the calculating step comprises calculating a maximum intensity along a line extending from each surface voxel and perpendicular to the surface into the brain tissue such that each line extends to a predefined maximum depth that is calculated individually by the processor for each surface voxel such that at least some positron emissions from brain white matter are eliminated from the SSP data set.

* * * * *